June 24, 1930.  W. BOCK ET AL  1,767,236
VIBRATION REGULATOR
Filed March 3, 1928   2 Sheets-Sheet 1
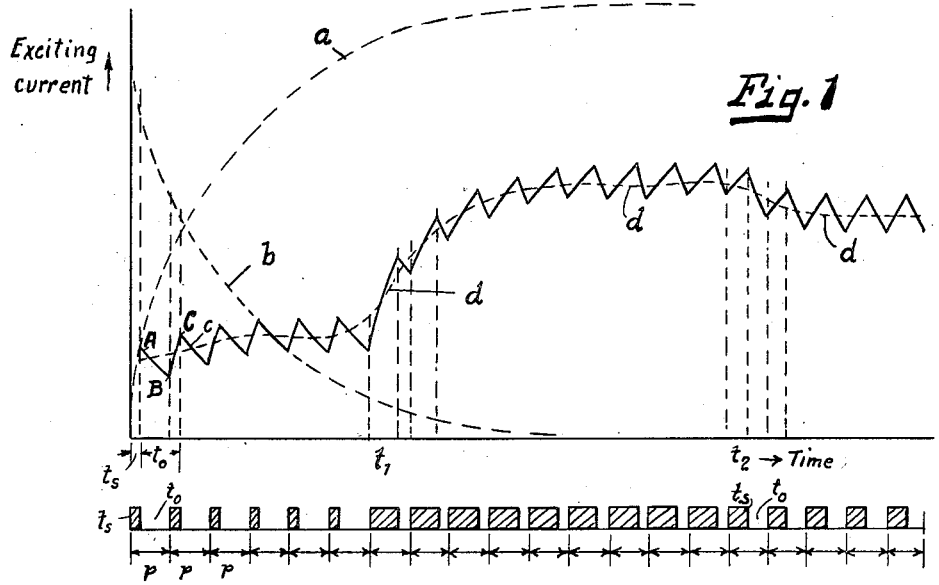
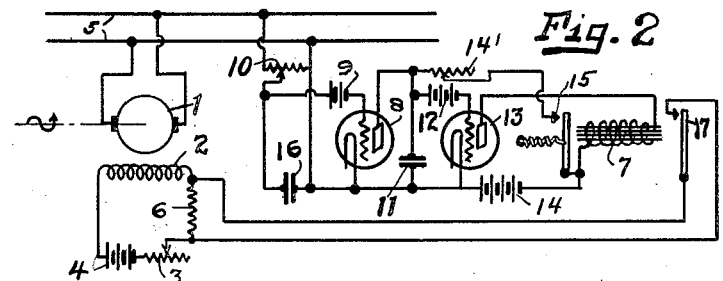
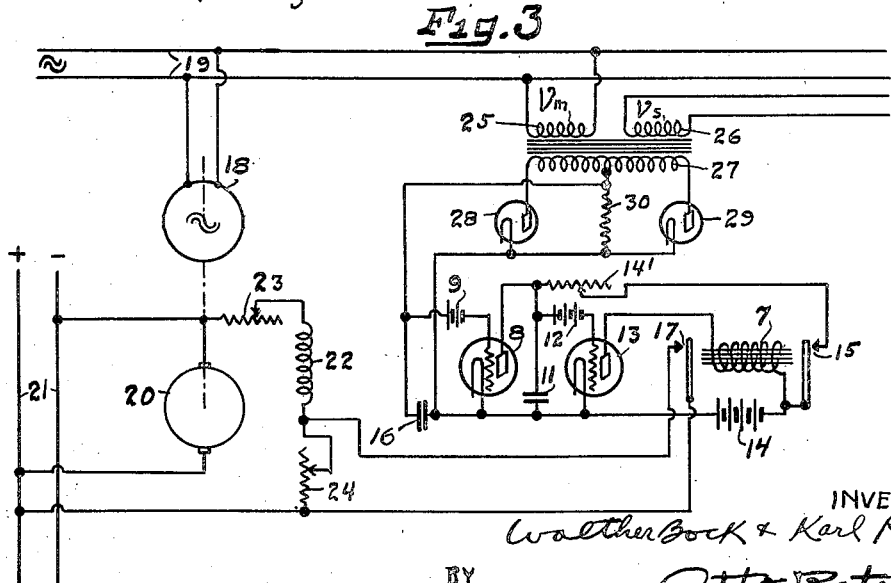
INVENTORS
Walther Bock & Karl Rath
BY Otto Ratz
ATTORNEY

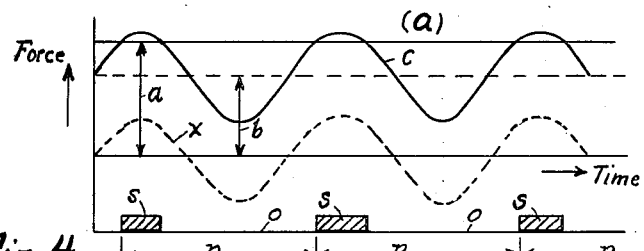
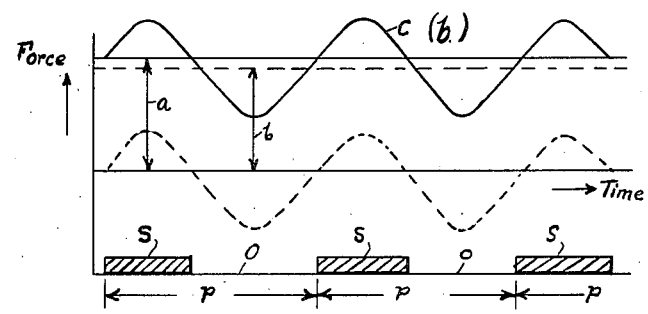
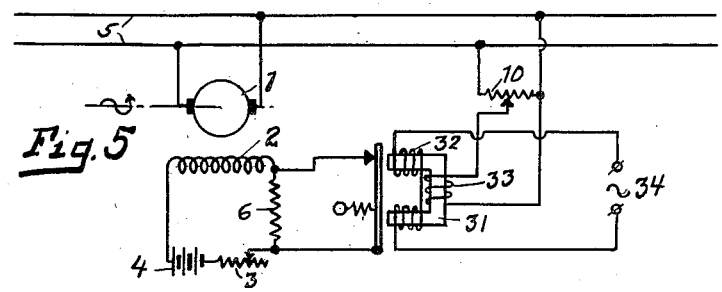
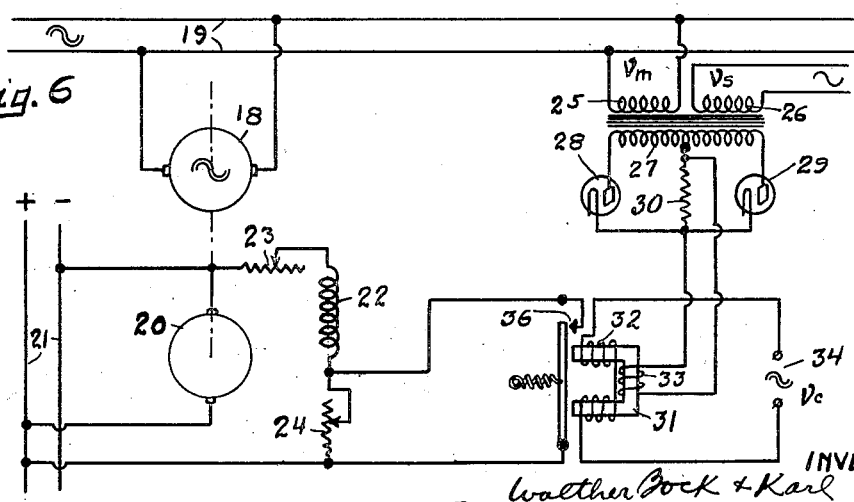

Patented June 24, 1930

1,767,236

UNITED STATES PATENT OFFICE

WALTHER BOCK, OF BERLIN-SCHONEBERG, GERMANY, AND KARL RATH, OF NEW YORK, N. Y., ASSIGNORS TO C. LORENZ-AKTIENGESELLSCHAFT, OF BERLIN-TEMPELHOF, GERMANY

VIBRATION REGULATOR

Application filed March 3, 1928, Serial No. 261,095, and in Germany March 14, 1927.

This application relates to an electrical regulator operating according to fast regulating or Tirrill principle. The main object of the invention is to replace the mechanical arrangement for controlling the vibrations and the regulating influence by a more accurate and precise electric control of said vibrations.

Another object of this invention is to make the closing and opening of regulating influence by purely electrical forces, and not by mechanical means.

Another object is to have an electrical relay for applying and withdrawing the regulating action, thereby increasing the speed and accuracy of regulation.

A further object is to introduce vacuum tube control for a relay to secure a greater sensitivity of response of the vibration regulator to variations in the magnitude to be regulated.

The invention is further described with reference to the accompanying drawings, which illustrate as follows:

Fig. 1 is a diagrammatic representation of the operation of vibration regulator with reference to the duration of time periods of regulating influence;

Fig. 2 is a diagram of connections suitable for carrying out the object of our invention, for the purpose of controlling the output voltage of a generator;

Fig. 3 is a similar arrangement to keep the frequency of an alternating current generator constant;

Fig. 4 is a diagrammatic representation of the variation in time intervals for a modified regulating scheme;

Fig. 5 is a diagram of connections for a modified arrangement for regulating the voltage of a generator by means of an alternating current supply; and Fig. 6 is a diagram of connections of a scheme similar to Fig. 5, for controlling the frequency of an alternating current generator.

The invention will be described with a short reference to the present art of regulation. Referring to the regulation of electrical current, for instance, the excitation current of an electrical machine for the purpose of keeping constant the pressure or the speed, or else for the purpose of synchronizing, there are fundamentally two distinct methods.

The first is the so-called slow regulation which consists of an arrangement in which the regulating mechanism begins to act only after a change has occurred in the magnitude to be influenced, and regulated (that is, in this case, of the current). This regulating mechanism exercises only then a corresponding regulating influence so that meanwhile the magnitude to be regulated may already have passed through a further change and in that way the regulating influence lags behind the change, hence the name, slow regulation. Such a regulation even when used as rough, in connection with more definite regulation, can only apply to small and slow changes of the magnitude to be held constant, and fails entirely when it is a case of extreme precision, as for instance, for speed regulation of electrical machines for generation of high frequency current or for securing synchronous operation of several devices, or else when it is a question of generating extremely constant voltages such as for measuring purposes.

For such uses the only method that need be practically considered is the other already well-known art of regulation to which this present invention also refers, and which therefore may be called fast regulation, or regulation according to the Tirrill principle. This method is already utilized for regulation of voltages by the well-known Tirrill voltage regulator for electric generators, and lately also for keeping constant the speed of the machine by the so-called Schmidt's centrifugal contact regulator. The principle of this regulating method consists in the fact that the permanent, that is also the normal condition, such as the correct value of the magnitude to be kept constant (pressure or speed) has a regulating influence periodically applied to and withdrawn from it, so that even with the least change of the magnitude to be kept constant the regulating action is fully exercised and the regulating force is thereby released immediately without any noticeable delay.

There is a further distinction of such a regulating method as against the above mentioned slow regulation in which the main disadvantage, among other disadvantages, is the equalization phenomena following the changes in current. This distinction is that such equalization phenomena disturbing the regulating procedure are practically excluded, especially the influence of the inductance of the windings such as exciting windings. This is made possible by using the so-called over regulation, that is, that the regulating influence is made several times bigger than is necessary for producing the normal condition. At the same time this excessive regulating force cannot exercise its full action, since it is forcibly applied and withdrawn right at the beginning of its regulating action. By this means the advantage is secured that the delay phenomena are practically entirely excluded, and an instantaneous regulating influence is obtained.

The required forced periodic application and withdrawal of regulation have in the present-day arrangements been secured in a mechanical manner, such as by spring contact means. This is, for instance, the case in the above referred to Tirrill voltage regulator, in which a movable contact arm carrying a contact is closing and opening periodically with a corresponding fixed contact to apply and withdraw the regulating influence. Also, in the speed regulator above referred to, a swinging device carrying the contacts is used in conjunction with a suitable opposite contact, for maintaining the speed. In this case both contacts are forced to close and open at a rate determined by a periodically applied force superimposed on a constant force. Such mechanical arrangements, however, have been found insufficient whenever extreme accuracy is necessary, hence the object of this invention is to determine the periodic application and withdrawal of regulating influence by electrical forces rather than by mechanical.

The invention therefore consists, briefly, of a device in which a regulating current or voltage derived from the arrangement to be regulated determines, in an electrical manner, the relation of the regulating duration to the regulating suspension duration in a definite regulating period such, for instance, as the relation of opening and closing duration of a relay.

The subject of the invention is made clearer by several practical examples, as in the accompanying drawings, with a further description of individual details. Similar notations in the drawings refer to similar elements.

As an example, in a machine the pressure of which must be kept constant or the speed of which must be equal to or synchronous with another machine, there may be included a resistance in the exciting winding and a suitable voltage applied to said exciting winding (for instance, from a separate source of excitation, or with self-excited machines from the armature terminals). When the circuit is closed a current will increase according to curve $a$ in the accompanying Fig. 1, that is, its final value will be reached only after a certain time, which is determined by the time constant of the circuit. If a value dependent on the exciting current, such as terminal pressure or speed is to be changed by influencing the exciting current, then it is well known that the regulating action will not occur immediately at its full value on account of the slowness of the increase in current, but only after a lapse of a definite time. Especially when it is a question of regulating large machines with considerable inductance of its magnetizing winding, this delay may have relatively large value. We have to deal in this case therefore, with the so-called slow regulation. If however, a suitably chosen resistance is included in the circuit after a short period of time $t_s$, for instance, by opening the contacts of a shunt circuit, then the current would increase to a point A and would decrease according to curve $b$, which is represented as an inverse of curve $a$. In this way a point B is reached in a short period of time $t_o$. At this instant the resistance is again short circuited by closing of the contacts, that is, it is excluded so that the current will increase again to point C, to be again reduced by a subsequent inclusion of the resistance. With a definite relation between the opening and closing of the contacts, that is, the application and withdrawal of regulating resistance, the current will reach an intermediate value represented by the curve $d$. The very short zigzag oscillations occurring actually around this value are practically of such a small magnitude that their action disappears entirely since it is applied only indirectly to the armature and through this again to the terminal potential or the speed. Up to the time interval which in the drawing is indicated as $t_1$, it is assumed that the intervals of closing of contacts $t_s$ are smaller than the intervals of opening the contacts $t_o$. If now this relation of opening and closing intervals of the contacts and respectively of the application and withdrawal intervals of the regulating resistance are changed, in such a way, for instance, that $t_s$ is larger and $t_o$ is smaller, then the average current $d$ is automatically increased to a higher average value. If later the relation of $t_s$ to $t_o$ is further reduced, as after the instant $t_2$, as illustrated in the drawing, the current again drops. As can be seen, these changes in the average current take place very rapidly, that is, after one or two openings or closings of contact, and this depends, as can be readily seen, on the shape of the curves $a$ and $b$, that is, on the proper dimensioning of the regulating resistance. In the drawing the opening and closing intervals, respectively $t_o$ and $t_s$, are illustrated for the purpose of survey for the same regulating period $p$. It represents therefore in this case a fast regulator which would operate on a vibration principle, and which is the more accurate the more often the change from opening to closing takes place during a unit time.

Fig. 2 shows a switching arrangement according to the invention, in which forced periodic opening and closing of regulating resistance takes place by means of a relay while the relation of opening and closing intervals which determine the degree of regulating action is controlled in a purely electrical manner by periodic charging and discharging of a condenser. The value of this relation is determined by the magnitude to be held constant. Fig. 2 applies specifically to a voltage regulator. Item 1 represents a dynamo machine which for simplicity is represented as a direct current machine with separate excitation. Item 2 is the magnet winding, 3 is the regulating resistance, and 4 is a separate source of energy for securing the constant exciting field. The machine supplies the network 5. A regulating resistance 6 is connected in the exciting circuit of the machine and is switched in and out periodically by means of a relay 7, in such a way that there is an average exciting current corresponding to the relation of opening and closing intervals of the relay 7, as described in connection with Fig. 1. By this means there is secured quite a definite terminal potential on the machine 1. According to this invention the control of opening and closing intervals of relay 7 takes place as follows:—

In the grid circuit of a tube 8 there is a condenser 16 together with a suitable source of biasing potential 9. This condenser is connected at one terminal to the resistance 10 which lies across the network potential and is thereby charged to a potential dependent on the terminal potential of machine 1 which is to be held constant. Since the internal resistance of a tube depends on the potential applied to its grid, the resistance of the tube 8 is quite definitely determined by the terminal potential of machine 1. Thus, if the value of the terminal potential is changed, the grid potential is also changed and thereby also the internal tube resistance; the latter is reduced with the rise of grid potential, and rises with the fall of the grid potential. This changing of the internal tube resistance determines the charging and discharging intervals of condenser 11. This latter is connected to the grid of a second tube 13 in connection with a biasing potential 12. The biasing potential 12 is chosen in such a way that it counteracts the potential 14 representing the source of anode current. The series resistance 14' serves to set the charging interval to a definite value.

Assume now that the contacts 15 of the relay 7 are closed. The condenser 11 is then charged by the battery 14; this eventually makes the potential on the grid of the tube so highly positive that an anode current begins to flow. If this is big enough the relay 7 is actuated and opens the contact 15, since its winding lies in the anode circuit of the tube. Now the condenser 11 begins to discharge and it will continue to discharge through tube 8 until the potential on the grid of tube 13 has again become so negative that the anode current is thereby suppressed and the armature of the relay 7 drops off again, closing contact 15. The process is then repeated. The charging and discharging of the condenser 11 and thereby the opening and closing of contact 15 is determined according to the value of the potential applied to the grid of tube 8, that is, indirectly according to the terminal potential of machine 1 to be kept constant, and their relation is correspondingly changed. If for instance the potential is high, then the resistance of tube 8 is low, therefore the charging of the condenser 11 at the closing of the contact 15 takes place slowly, and discharging takes place rapidly, whereby the duration of the closing of contacts is relatively long and the duration of the opening of the contacts is relatively short. If on the other hand the grid potential is low (that is, a terminal potential of the machine is reduced) then the resistance of the tube is higher, the charging takes place relatively faster, the discharging takes place relatively slower; in other words, the duration of closing of contact 15 is shorter and the duration of opening correspondingly longer. The movement carried out by contact 15 is similarly carried out by a contact 17 controlled by the same relay 7. This contact in its turn controls the regulating resistance 6 of the exciting circuit of the machine 1 with a similar relation of closing and opening. In the last example, where the machine potential was reduced, it resulted in shortening of the closing duration and a corresponding lengthening of the opening duration of the contact 15, and therefore also the increase of the closing duration and respective shortening of the opening duration of contact 17. This would be equivalent, as a glance at Fig. 1 would show, to an increase in the average exciting current $d$ in the exciting circuit of the machine, as it is shown, for instance, in Fig. 1 after the instant marked $t_1$. The practically instantaneous increase in the average value $d$ of the exciting current of the machine without delay or slowness results in a similar increase of the terminal potential so that the original potential is thereby maintained.

Fig. 3 shows an analogous arrangement using the above described switching arrangement for regulation of the speed or for synchronizing of rotating machines or devices. As an example, Fig. 3 refers to keeping accurately constant the speed of a high frequency machine 18, the excitation of which is omitted for the sake of clearness. The machine supplies an operating circuit 19 (for instance, a wireless installation). The machine is driven by means of a direct current shunt motor 20, the speed of which must be kept extremely constant in order to maintain the frequency of the high frequency alternating source to as constant a value as possible. The driving motor 20 is fed from direct current network 21. Its exciting winding is indicated by 22. Item 23 represents an adjusting resistance in the exciting circuit, and 24 is a regulating resistance corresponding to resistance 6 of Fig. 2.

The regulation takes place in such a way that the alternating current of machine frequency $v_m$ and the alternating current from a constant fixed standard frequency $v_s$ are applied to coils 25 and 26 of a differential transformer. The secondary coil 27 of this transformer will then have a resulting current which depends on the relative phase difference of the two currents. This is rectified by means of a two-way double tube rectifying arrangement consisting of valve tubes 28 and 29 and is utilized from the terminals of a resistance 30. The potential of resistance 30 is therefore dependent on the resulting current in coil 27 which in its turn, as described above, depends on the relative phase shift of the two currents of frequencies $v_m$ and $v_s$. Since $v_s$ is standard and is supplied constant, this potential depends on the deviation of frequency $v_m$, that is, the change in the speed of the high frequency machine 18, and respectively driving machine 20.

The potential existing on resistance 30 and corresponding to the definite speed operates now in exactly the same manner as was the case in Fig. 2, on an arrangement for controlling a relay which opens and closes the regulating resistance 24 on the driving machine 20. The arrangement consists again of the two tubes 8 and 13, the relay 7 with contacts 15 and 17, grid condenser 16 and controlling condenser 11. Numeral 9 is again the grid biasing battery of the tube 8, and 12 the same for tube 13, while 14 is the anode current source and 14' adjusting resistances.

If the machine runs the least amount too fast, that is, if the machine frequency $v_m$ is by the least amount larger, than the average superimposed current in the secondary coil 27 would produce in the resistance 30 such a change in potential that with the correct setting of the normal phase difference of the two currents of frequency $v_m$ and $v_s$ as well as with the correct relative activation of contacts 15 and 17 of relay 7, the resulting current in the motor exciting circuit would immediately assume a new value which would bring back the original speed. In the example illustrated, that is, where the speed may have increased, the average exciting current is increased so that the tendency to increase all speed is suppressed at its inception. If it is necessary to regulate the speed absolutely constant, as in the present example, then the controlling frequency $v_s$ must be practically constant. For this purpose any suitable current source may be used, such as a piezo-electric crystal oscillator, a small encased tube sender, or even the amplified current of a usual pendulum oscillator, etc. If it is a case of synchronizing two rotating arrangements, for instance, of two rotating machines, then it should not be understood that $v_s$ is a locally produced standard controlling frequency, but that it is an alternating current frequency derived from the synchronizing device which is sent by means of wires or without wires to the arrangement to be synchronized that is, as in the case according to Fig. 3, to the machine 20. The latter alternating current frequency from the sending or synchronizing side may be produced as an example by applying a small alternating current generator on the shaft of the synchronizing arrangement. A similar alternating current generator is then mounted on the shaft of the device to be synchronized, that is, in the case of Fig. 3 on the shaft of machine 20 (corresponding to high frequency machine 18 of Fig. 3). If the frequency of the two alternating currents are exactly alike at the synchronism of the two devices (one frequency of the current from the synchronizing arrangement, the other from the arrangement to be synchronized), and if the correct relative phase difference is present at synchronism, then the least deviation of the arrangement to be synchronized from the synchronous condition and the resulting phase difference would influence the speed instantaneously in accordance with the manner described in Fig. 3, in such a way that a continuous synchronism is maintained.

A further example of carrying out the idea of the invention is represented in Figs. 4 to 6. The periodic opening and closing of the regulating relays is secured by means of an alternating current of suitable frequency, while the duration of opening and closing within a regulating period on which the amount of regulation depends is secured by a variable biasing potential of the relay which depends on the magnitude to be regulated, such as the terminal potential or speed.

Fig. 4 represents diagrammatically the corresponding time relations. In this figure, 4ª has for an abscissa the time and for the ordinate the force. The line $a$ parallel to the abscissa axis is the force which is necessary to cause the touching of the two relay contacts, so that for all forces which are greater than $a$, the contacts are closed and for forces which are below the value of $a$ the contacts are open. We may have on the relay a constant force (constant biasing potential $b$) as well as a periodical, preferably sinusoidal changing force $x$, which is superimposed on the first so that it results in the total active force $c$. The interval of closing of the contacts $s$ and the interval of opening $o$ during one period $p$ of regulation would then be represented as in the figure. If, as in Fig. 4ᵇ, the constant force $b$ is changed, that is, the biasing of the relay, then it can be readily seen that the closing interval $s$ has increased relative to the opening interval $o$ during one regulation period so that with this arrangement also the same effect is secured as that in Figs. 2 and 3, i. e., the changing of the magnitude to be influenced acts on the relation of the opening and closing intervals of a relay or the like.

Fig. 5 shows a simple form of carrying out this idea of potential regulation. Item 1 represents a dynamo machine as in Fig. 2, which is connected to the network 5 and the exciting winding of which, 2 is supplied from a separate source 4 through an intermediate resistance 3. Item 6 represents again a regulating resistance inserted periodically in the circuit of exciting winding. A relay 31 carries two windings, 32 and 33, and is periodically excited by means of a suitable alternating potential source 34 which supplies the winding 32, and which would correspond to curve $x$ of Fig. 4ª. The second winding 33 which may be designated as a polarizing winding, is connected to a potential difference dependent on the potential of machine 1 to be held constant. This latter is obtained by means of a potentiometer 10 across the terminals of the network. If for instance the machine potential is increasing, then the potential of potentiometer 10 is correspondingly increased, and therefore the constant premagnetization of relay 31. This results in the increase of the constant force acting on the armature of the relay, which results in an increase of closing interval in relation to opening interval as illustrated in Fig. 4ᵇ. This latter finally causes, as can be readily noticed, an increase of the opening interval of the resistance 6 in relation to the closing interval during a regulation period and this again results, as a glance at Fig. 1 after the time period $t_2$ would show, in the fact that the average exciting current $d$ is decreased and thereby also the terminal potential of the machine 1, that is, the latter will be maintained at a constant value. Fig. 6 shows a corresponding arrangement for speed regulation as a counterpart of Fig. 3. Item 18 represents again a high frequency machine, the exciting winding of which is omitted for the sake of clearness. Item 20 is the driving machine which in this example is a direct current shunt motor with magnetizing winding 22 and a regulating resistance 24 for periodic control. Item 21 is the direct current network supplying the motor, and item 19 is the utilizing network of the high frequency machine; $v_m$ represents again, as in Fig. 3, the frequency of the arrangement to be regulated, in this case the frequency derived from the machine, that is here the machine frequency itself; $v_s$ is the controlling or synchronizing frequency necessary for control purposes, exactly as in the arrangement according to Fig. 3. Items 25 and 26 are the input coils, and 27 is the secondary coil of a differential transformer. Items 28 and 29 are two rectifier tubes, and item 30 is a resistance, from the ends of which is obtained a potential corresponding to the speed or frequency to be regulated. Item 31 is the control relay with a winding 32 which is again supplied by a constant alternating current from a source 34 with a resulting periodical magnetizing field, while item 33 is a biasing coil connected to the terminals of resistance 30 to produce the magnetic force of a constant direction. The relay contacts 36 are again connected to the ends of the regulating control resistance 24. As the relay arrangement may be fixed, while the resistance may be rotating with the rest of the field structure, slip-rings 35 are supplied between the two. The arrangement of contacts 36 on one or the other side of the relay armature depends on what phase shift $v_m$ and $v_s$ have under normal conditions, that is, whether with an increase in speed or frequency there is an increase in the superposed current or a reduction of the same in coil 27. For instance, if the device is working normally between the phase difference of 0 and −180°, that is, the current to be controlled such as the current taken from the high frequency machine in Fig. 6, lags behind the controlling or synchronizing current, say by −90° phase difference, than an increase in the machine speed or an increase in frequency would result in an increase of current in the coil 27. This means an increase in the potential of the resistance 30 and therefore an increase in the premagnetization of relay 31, which would again result in an increase of closing interval relative to the opening interval.

As a glance at Fig. 1, after the instant $t_1$, would show, this is equivalent to an increase in the resulting average current flowing through the field windings, causing the speed to be held back to its former value.

In the claims the expression "response current" shall be understood to mean the current required to cause the touching of the relay contacts, so that for all currents which are greater than the response current the contacts are closed and for all currents which are smaller than the response current the contacts are open.

Having described my invention, what I believe to be new and desire to secure and protect by Letters Patent of the United States is:—

1. In a speed regulating system for a rotatable body, an electric circuit for controlling the speed of said body, a relay, a source of alternating current of constant frequency and amplitude for periodically energizing and deenergizing said relay, means for deriving an electric voltage proportional to the speed of said rotatable body, a biasing circuit for said relay supplied by said voltage, the current flowing in said biasing circuit being approximately equal to the response current of said relay when the speed of said rotatable body is normal and circuit connections whereby said relay controls said first-mentioned circuit.

2. In a speed regulating system for an electric motor, a speed influencing circuit for said motor, a relay, a source of alternating current of constant frequency and amplitude for periodically energizing and deenergizing said relay, means for deriving an electric voltage proportional to the speed of said motor, a biasing circuit for said relay supplied by said voltage, the current in said biasing circuit being approximately equal to the response current of said relay when the said motor is operating at normal speed, and circuit connections whereby said relay controls said speed influencing circuit.

3. A speed regulating system for an electric motor, a shunt circuit for said motor, a dynamo driven by said motor, a relay, a source of alternating current of constant frequency and amplitude for periodically energizing and deenergizing said relay, a biasing circuit for said relay supplied from said dynamo, the current in said biasing circuit being approximately equal to the response current of said relay when the speed of said motor is normal, and circuit connections whereby said relay controls said shunt circuit.

4. In a speed regulating system, a means the condition of which is to be regulated, an electromagnetic means for regulating said condition, said electromagnetic means being periodically operated by an alternating current of constant frequency and amplitude and adapted to periodcally influence the conditions to be regulated, means for deriving an electric voltage proportional to the magnitude of the condition to be regulated, a biasing circuit for said electromagnetic means supplied by said voltage, the current in said biasing circuit being approximately equal to the response current of said electromagnetic means when the condition to be regulated is normal.

5. In a speed regulating system, a prime mover, means for generating an alternating current of a frequency corresponding to the speed of said prime mover, a source of alternating current of constant frequency and amplitude, means for superimposing one of said alternating currents on the other, means for producing a direct current of varying intensity corresponding to relative phase changes of both of said currents, a speed regulating circuit for said prime mover, a relay regulating device adapted to control said speed regulating circuit by periodically imposing on and withdrawing a regulating force from said circuit, a second source of alternating current of constant frequency and amplitude for operating said relay periodically and means to bias said relay by said direct current, said biasing current in a state of normal speed of said prime mover being approximately equal to the response current of said relay.

6. In a speed regulating system, a direct current motor, a high frequency generator driven by said motor, a source of alternating current of constant frequency and amplitude, equal to the frequency and amplitude of the current derived from said generator at normal speed, means for superimposing one of said currents on the other, means for deriving a direct current varying in accordance with the relative phase difference between said alternating currents, a shunt circuit for said motor, a resistance in said shunt circuit, a relay for periodically short circuiting said resistance, a second source of alternating current of constant frequency and amplitude for operating said relay and means for biasing said relay by said direct current, said biasing current being approximately equal to the response current of said relay when the motor is operating at normal speed.

In testimony whereof we have affixed our signatures.

WALTHER BOCK.
KARL RATH.